Oct. 6, 1970   L. B. WALLERSTEIN   3,531,847
PROCESS AND MECHANISM FOR MAKING ROUND END PREPARED CUT BANDAGES
Filed Sept. 20, 1967   6 Sheets-Sheet 1

INVENTOR
LAWRENCE B. WALLERSTEIN
BY
ATTORNEY

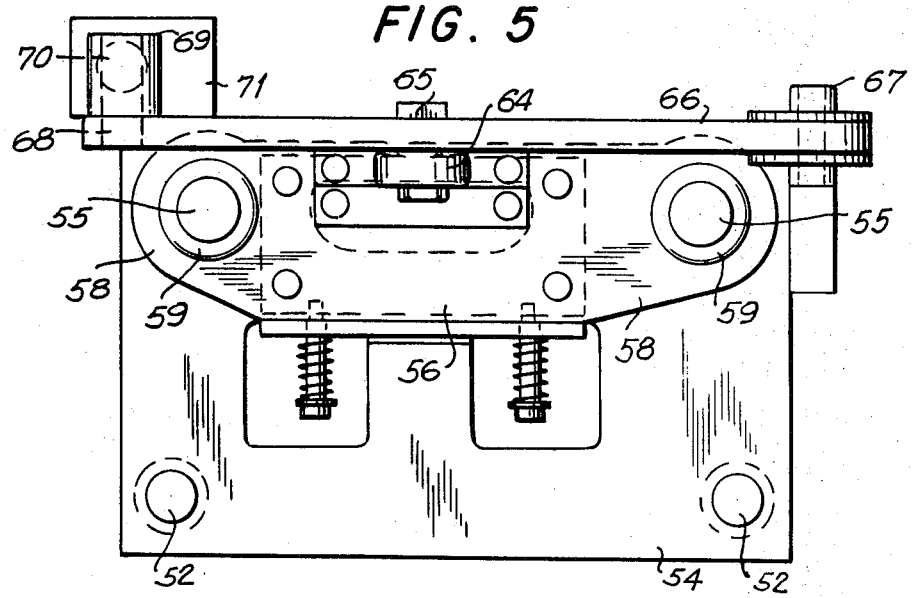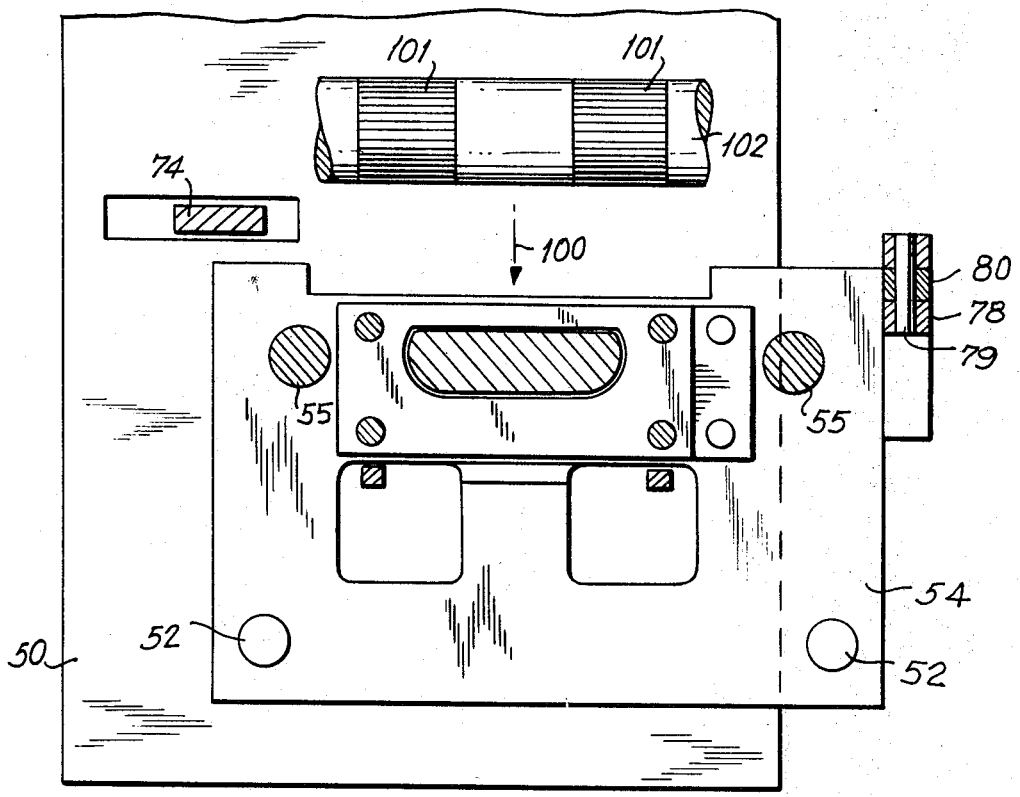

INVENTOR
LAWRENCE B. WALLERSTEIN
BY
ATTORNEY

Oct. 6, 1970   L. B. WALLERSTEIN   3,531,847
PROCESS AND MECHANISM FOR MAKING ROUND END PREPARED CUT BANDAGES
Filed Sept. 20, 1967   6 Sheets-Sheet 6
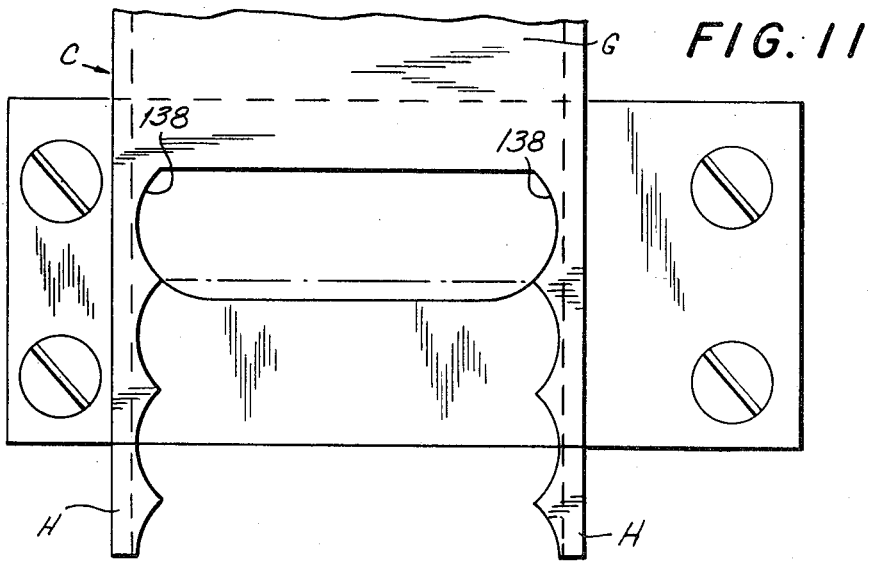
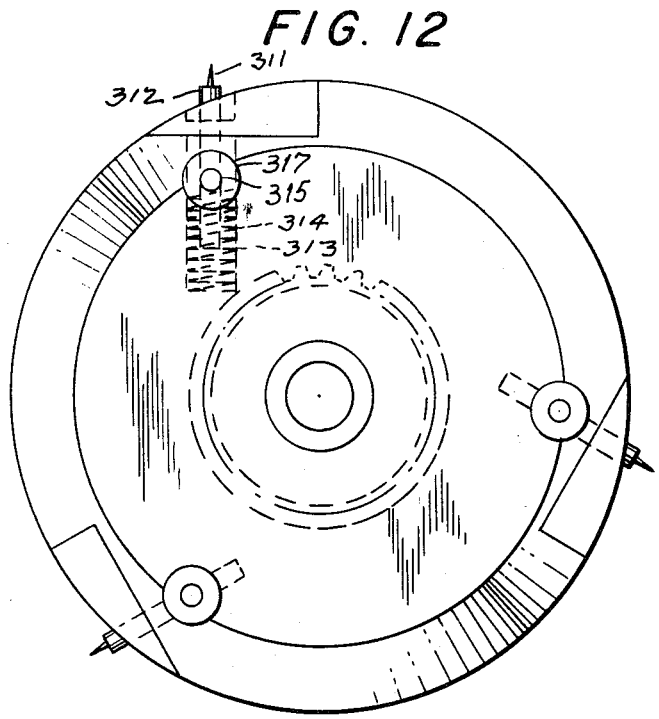
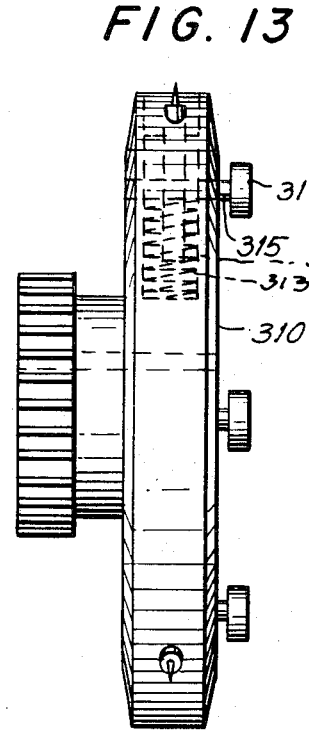
INVENTOR
LAWRENCE B. WALLERSTEIN
BY
ATTORNEY 3,531,847
PROCESS AND MECHANISM FOR MAKING
ROUND END PREPARED CUT BANDAGES
Lawrence B. Wallerstein, 87 Daisy Farm Road,
New Rochelle, N.Y. 10804
Filed Sept. 20, 1967, Ser. No. 669,170
Int. Cl. B23p *11/00;* B23b *19/04*
U.S. Cl. 29—411                        6 Claims

ABSTRACT OF THE DISCLOSURE

The present disclosure sets forth a round end prepared cut bandage and a method and machine for making the same. The machine has an assembly position, a die cutting position and a wrapping position, and the various parts of the bandage are assembled to form a continuous strip and then are advanced to die cutting position, where the bandage is cut with the side curved arcuate edges being wider than the ends of the bandage so that the cutting is complete across the side and end edges of the bandage.

---

The present invention relates to a method and machine for prepared bandages and particularly relates to a method and machine for making rounded-end bandages.

It has been found that methods of making bandages which involve crushing the edges are not satisfactory in that there frequently is a residue of crushed paper lint which follows through with the bandage giving rise to presence of unsightly or extraneous material in the finished wrapped product.

It is among the objects of the present invention to provide a method and machine for cutting out rounded-end bandages which lends itself to perforated or ventilated backing strips receiving the gauze pads in proper placement relative to the perforation pattern, with the carrier strips or overlapping protective strips for the adhesive being readily associated with the gauze pad assembly and with the entire web beng readily advanced to die-cutting position and cut with a high degree of precision and at a high production rate.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present inventon.

In accomplishing the objects of the present invention, the assembled web consisting of the centrally overlapping carrier or protective strips, the gauze and the adhesive-carrying, perforated and ventilated backing strip may be fed to a reciprocatory die. The cut bandages after the die-cutting operation are successively impaled upon the pins of a transfer wheel which is cam-actuated to pierce the cut bandages at the proper moment in the cycle and then deposit the cut bandages upon a wrapper strip. The cut bandages are then carried away by the wrapper strip which is subsequently glued, folded, tucked, glued again and discharged from the machine into a stacker. In the stacker, the cut bandages may be counted and prepared in unit assemblies. Then, the wrapped and assembled bandages may go to a sterilizer, where the process is completed and the bandages are then commercialized.

The most important feature of the present invention is the method and means for forming a rounded edge on the prepared adhesive bandage with the elimination of sharp corners. The elimination of sharp corners will make a better adhesive, with lessened tendency of the corners to pull loose during usage. Moreover, with the elimination of square or sharp corners, the bandage will adhere better to the skin or body portion being protected. In addition, the very thin, flexible, plastic-type backings of thin vinyl or polyethylene polymeric sheet material is more readily associated with relatively heavy protective strips, such as cellulose triacetate paper laminated strips in that less stress and stretching results when the protective strips are removed from the bandage in connection with or preparatory to application of the bandage. The more balanced stretching of the backing is achieved without unevenness or curling of the bandage, and there is less springback due to plastic memory.

Furthermore, the difficulty of the adhesive curling up on itself, with the adhesive making the bandage useless because of tackiness, is avoided. A rounded edge, such as produced by the present application, without crushing, is particularly advantageous inasmuch as there is no sudden release of the full tension between the adhesive and the acetate facing of the protective strips and the bandage itself is released in a smooth, symmetrical curve, eliminating resultant uneven stresses.

As the cover strip is removed the plastic tends to stretch slightly. When the cover strip being removed reaches the curved ends of the bandages, small longitudinal ribs or ridges form momentarily, so that when final separation is achieved the plastic cannot curl back on itself thereby becoming unusable. These ribs or ridges disappear immediately after removal is completed and the bandage with cover strip removed will be limp and ready for application without distortion.

It has been found that in the preferred design of the machine, the die-cutting device should be a greater width and amplitude than the actual width of the bandage prepared. Not only is a more balanced bandage produced from the assembly web, but there is no loss of web material since it need not straddle the full opening in the die. The die generally consists of a male element and a female element, suitably designed to give a curvature but also designed to be much wider than the cut bandage, so that the assembly need not advance over the entire face of the die prior to the die-cutting operation.

The die in this manner serves to compensate for any slight variation in movement of the material and also any unevenness due to variations in tension, in the amount of wear on the machine creating various degrees of backlash, and any other factors including slippage, misalignment and the like.

Any variation in the feed of plus or minus 5 to 10 thousandths is readily taken care of. There is no likelihood of jamming of the die and the cut bandage will have clean edges at all times.

The backing may be of transparent or opaque plastic having an average thickness of .003 inch. It may vary from .002 to .004 inch. The plastic backing may consist of a polyvinyl chloride plastic film plasticized to achieve softness and stretch desired. The backing may also be a waterproof cloth impregnated or coated on one side with a suitable water repellant coating.

The backing may also be plain cotton, or water repellant fabric with a plain fabric having a waterproof coating or lamination on one side.

The pressure sensitive adhesive may be based on natural rubber or rubbers or synethic rubber or rubbers, or a combination of both. In addition it should include other ingredients to provide the desired degree of tackiness, softness, resistance to agent and desired degree of cold flow. The adhesive may also contain fillers, such as zinc oxide or powdered silicates, to reenforce and improve general properties.

The cover strips may be of laminate containing a facing of cellulose triacetate on the adhesive side or it may be extruded or sheet plastic.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 5 is a transverse sectional view upon the line 5—5 of FIG. 4.

FIG. 6 is a transverse sectional view upon the line 6—6 of FIG. 4.

FIG. 11 is a fragmentary top plan view showing the manner in which the curved end bandages are cut out from the continuous strip.

FIG. 12 is a side elevational view of the prepared cut bandage discharge wheel.

FIG. 13 is an end elevational view of the discharge wheel of FIG. 12.

Figure 1:
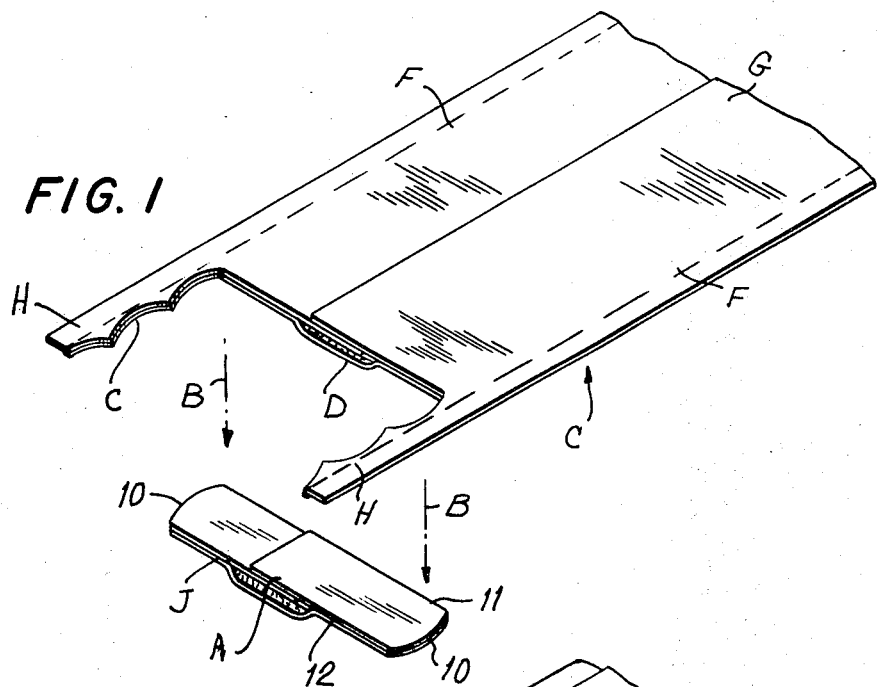
FIG. 1 is a top diagrammatic perspective view showing the rounded end, prepared bandage being die cut out of a continuous strip of material having absorbent pads, the removable cover strips and the adhesive tape base strip already assembled.
Figure 2:
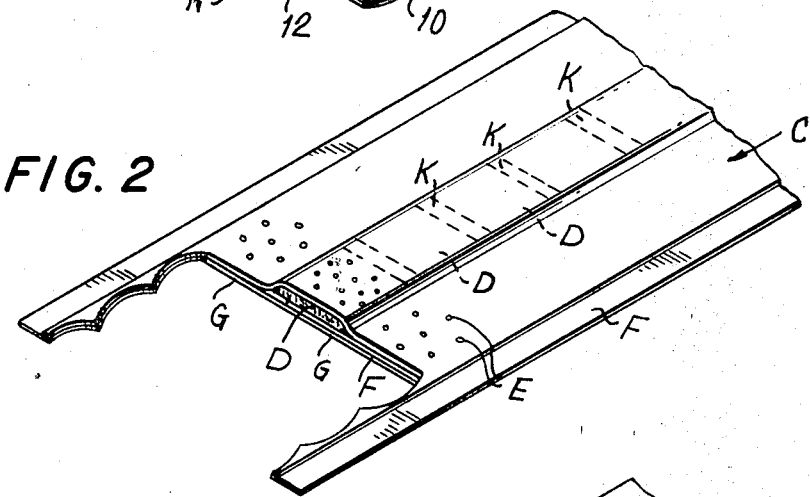
FIG. 2 is a top perspective view similar to FIG. 1, showing the other side of the strip of FIG. 1, from which several rounded end bandages have been removed.
Figure 3:
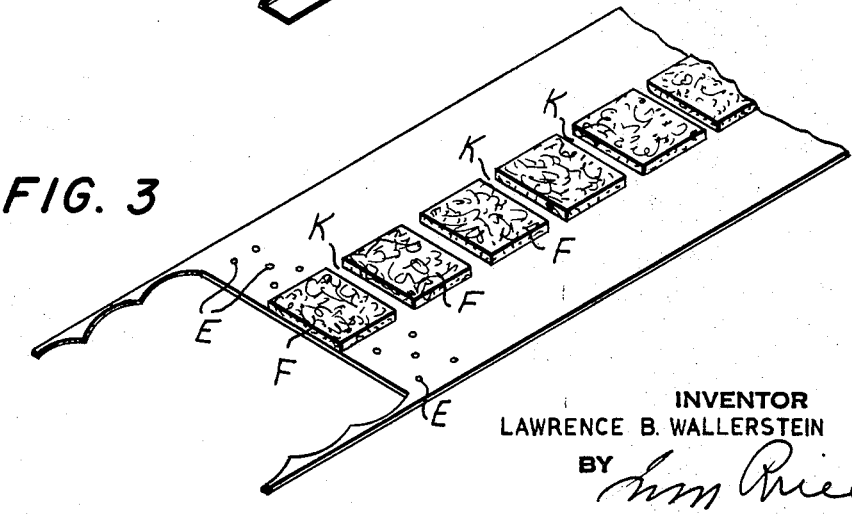
FIG. 3 is a top perspective view similar to FIGS. 1 and 2 showing the gauze pads in position on the strip before the cover strips have been applied.
Figure 4:
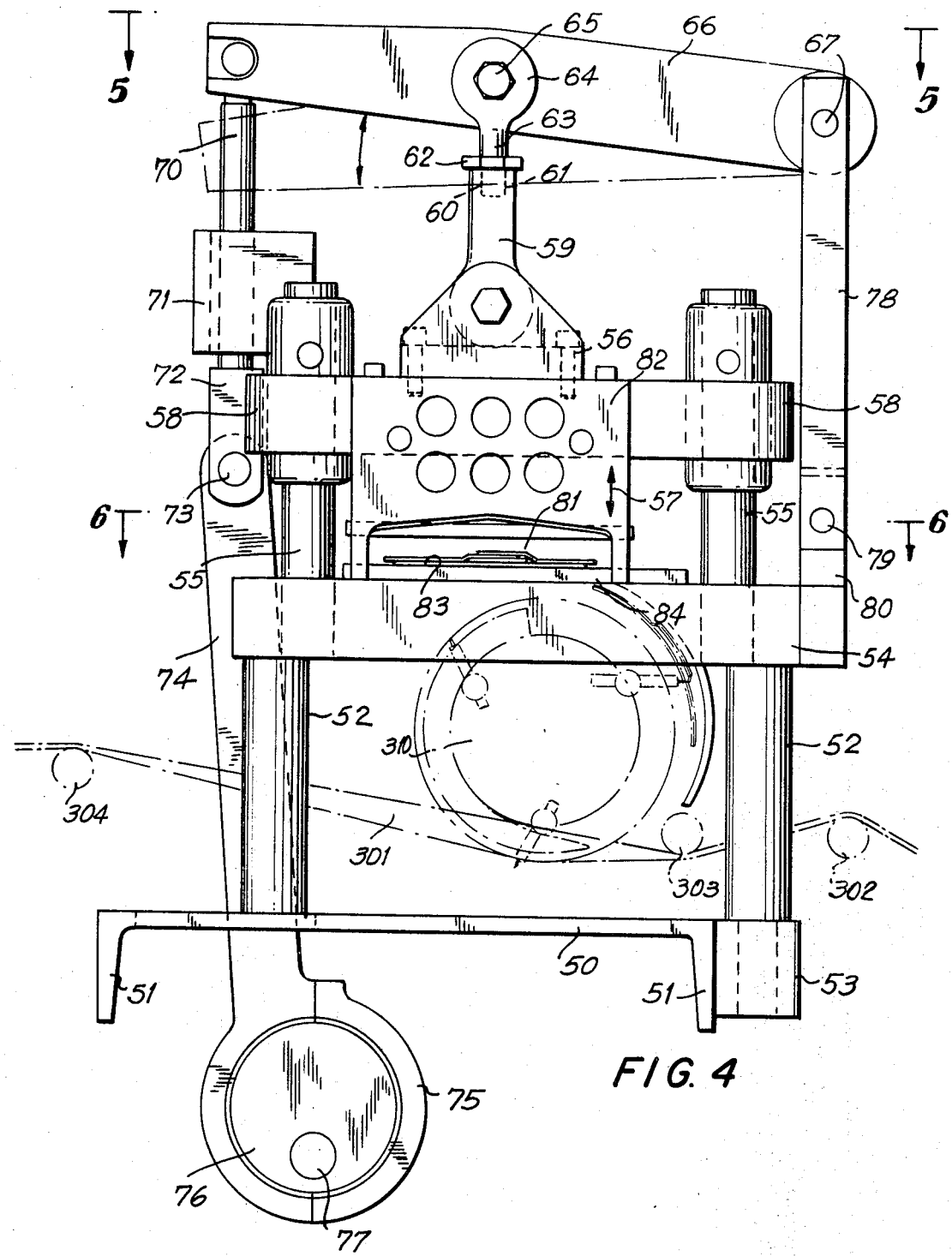
FIG. 4 is a vertical side elevational view showing the punching mechanism for cutting out the rounded end prepared bandages of FIGS. 1 to 3.

Referring to FIGS. 1 to 3, a rounded-end, prepared cut adhesive bandage A has been die-cut as indicated by the arrows B from the continuous strip C. The continuous strip C has a base layer D which has been previously perforated as indicated at E in FIGS. 2 and 3 and carries a series of separated gauze or absorbent pads F.

The adhesive face of the strip C is covered by the removable cover strips F which overlap at G. The only waste will be the material H. Each side of elongated edge margin J of each prepared cut bandage A will be immediately adjacent the next prepared cut bandage. The strip is cut midway of the space K between the gauze pads.

The prepared cut bandage A of the present invention is cut on three edges, namely the two end rounded edges 10 and the straight edge 11.

The perforated base strip C is of flexible sheet material, such as vinyl plastic formed of a polymer of vinyl chloride and vinyl acetate and/or vinylidene chloride and vinyl acetate or a very thin sheet of either polyethylene or polypropylene. It is possible to cut cleanly by cutting only three edges, as indicated in FIG. 1, without stretching or distortion of either the thin flexible base sheet C or the overlapping cover strips F—F.

The three edges will be cut in succession since the movable male element of the die is slightly oblique to the horizontal and will start cutting at one end of the bandage first.

The backing may also be composed of cloth, or a combination of cloth and plastic.

The vinyl film may be cast or calendered, transparent, translucent, or opaque, and is very flexible and elastic in all directions. When opaque, it is usually a fresh color. The transparent or translucent plastic is coated with a transparent or translucent adhesive mass.

The machine which has been found most satisfactory for accomplishing this die-cutting is best shown in FIGS. 4 to 10. This machine has a base structure 50 with the side supporting flanges 51, upon which are mounted the vertical posts 52 by the eye members extension block 53. These posts 52 support the elevated plate 54, which receives the upper guide posts 55, which in turn carry the reciprocating member 56 having the reciprocatory motion as indicated at 57.

The die carrying member has the sidewardly extending eye member 58 having the sleeves 59 which ride on the posts 55. The reciprocatory member 56 is provided with an upwardly extending driving connection 59, which has a threaded adjustable connection at 60 to the tapped upper end 61 of the vertical post. The nut 62 will hold the elements in adjusted position.

The stud 63 carried by the eye 64 and held by means of the nut and bolt 65 upon the reciprocating arm 66 will drive the die member 56 upwardly and downwardly, as indicated by the double arrow 57. This arm 66 has a floating pivot 67 extending over to the pivot and shear pin 68, which extends through the member 69. The member 69 is associated with the depending push-rod 70 leading to the block 71. The block 71 is a guide member mounted on the frame structure of the machine and it guides push-rod 70 in its movement.

The connecting link 74 is connected at its lower end to the eye 75. The eccentric 75 is driven by the shaft 77. The rotation of the eccentric 76 will reciprocate the link 74 and the push rod 70 and the arm 66 to give a synchronized harmonic motion.

The reciprocating arm 66 is pivotally mounted at 67 on the vertical bar 78, which in turn is mounted by the pin 79 upon the vertical structure 80 on the table 54. Through the opening 81, below the waste cut-off blade 82, will be fed the bandage 83, which passes over the die 84 having an opening through which the cut prepared rounded end bandages are ejected.

The feed of the bandages A is best shown in FIG. 6. The combined bandage structure C will be fed as indicated by the arrow 100 by means of the knurled portions 101 of the feed roll 102 which press down upon the assembled strip C. (See FIG. 6.)

Figure 7:
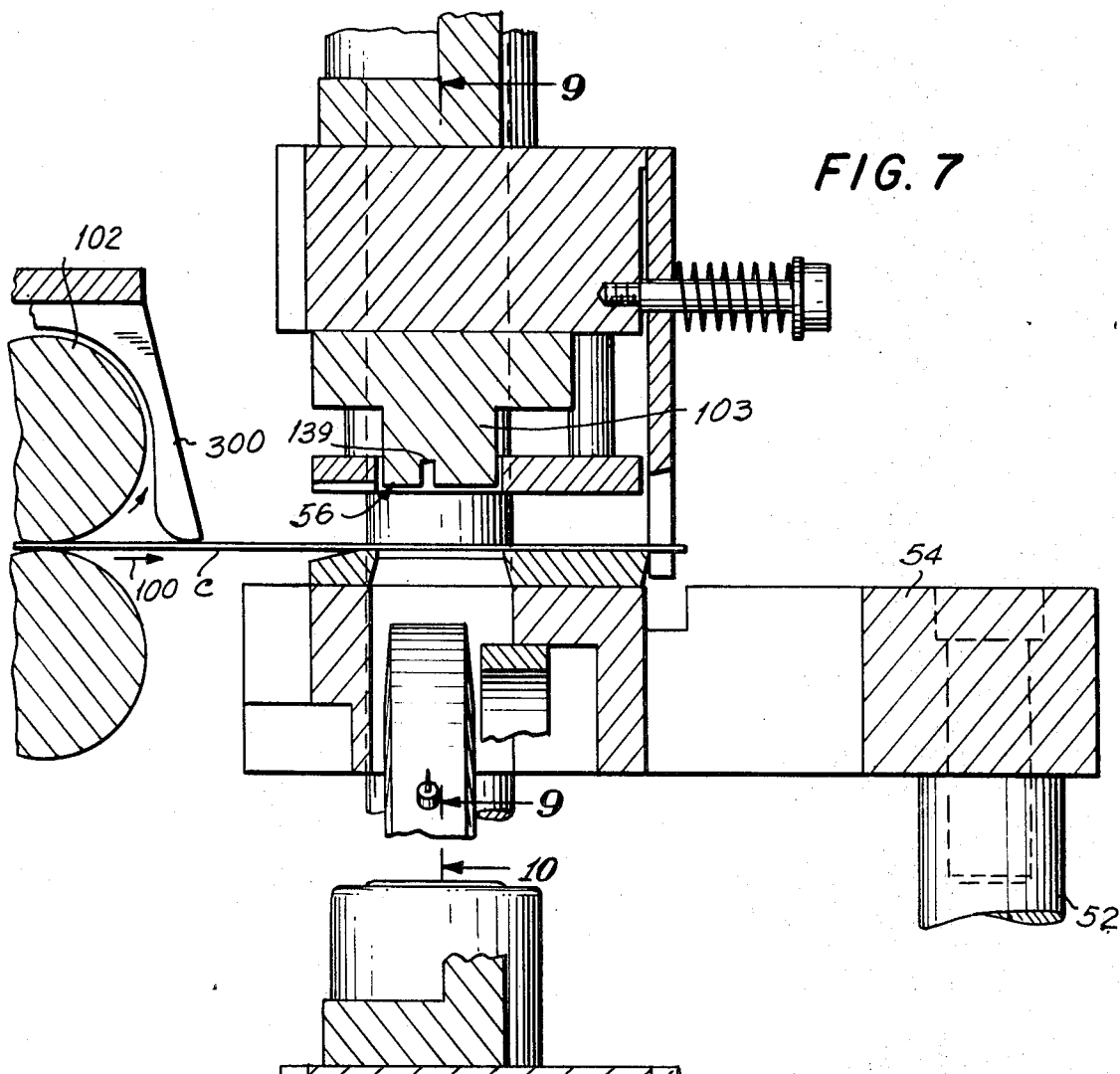
FIG. 7 is a fragmentary side sectional view showing the feed of the bandage strip to the punching machine.

In FIG. 7 is shown the feed roll 102 which feeds the combined strip in the direction 100 to the reciprocating die structure 56. This pivotal structure has a depending male die portion 56 which will cut the rounded end prepared bandage A from the continuous strip C through the die opening 104.

Figure 8:
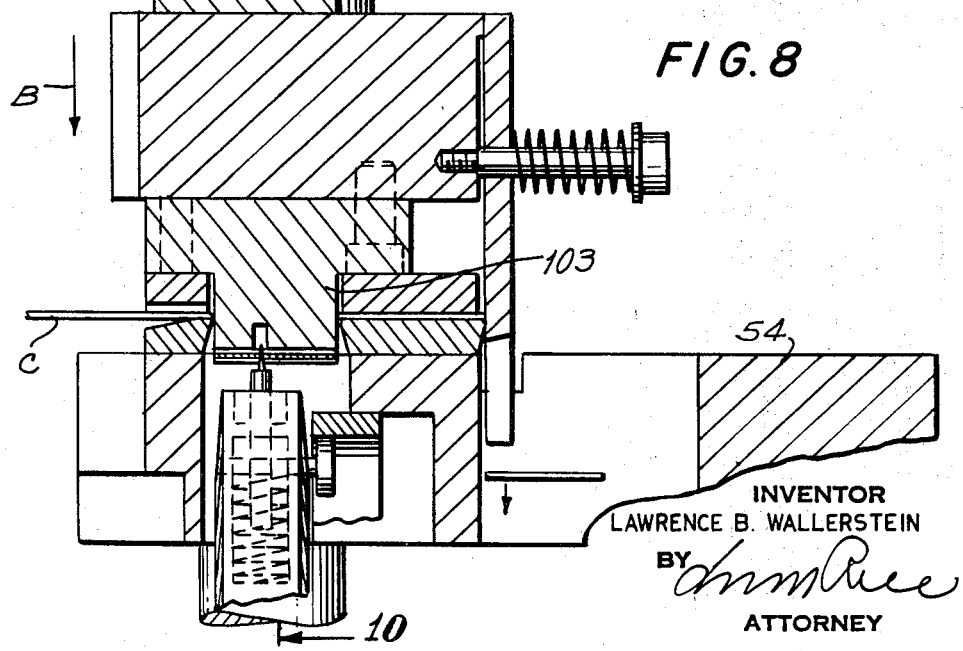
FIG. 8 is a transverse sectional view similar to FIG. 7, but advanced 180° in the cycle, showing the prepared, cut, rounded-end bandages being removed from the prepared strip.

FIG. 7 shows the position with the die element 56 elevated, with FIG. 8 showing it lowered, as indicated by the arrow B. It will be noted that the prepared bandage A will be sectionally cut out of the continuous strip C and impaled on the surface of a rotating pin wheel and transferred to the wrapping station.

The die element 56 is carried by the support structure 58, which has the openings 126 for receiving the guide pin bushings 127 encircled by the coil springs 128. The coil springs 128 react against the guide bushings 129.

These bushings 129 are at the lower ends of the guide openings 130, through which the reciprocatory posts 127 having enlarged heads 131 are positioned. These posts have threaded lower end studs 132 which are threaded into the openings 133 in the stripper plate member 134.

It is thus apparent that the invention envisages an improved method of providing a prepared cut rounded end bandage, which does not result in a crushed edge, with the gauze pads in proper placement, and without distortion of the perforated thin plastic carrier strip.

The bandage is always die-cut on both rounded edges and one longitudinal edge and is not die-cut all around. Desirably, the top portion 125 of the die structure should be of solid aluminum, as should the connecting brackets 59, 74 and 75, and the arm 66.

The use of aluminum lightens the reciprocating portions and reduces inertia and vibration and requires less power to operate.

The eccentric cam element 76 should be of a strong alloy, such as steel. The male portion of the die, as indicated in FIG. 9, is slightly oblique to the horizontal, the lower side edge 142 being slightly lower than the lower side edge 141.

Figure 9:
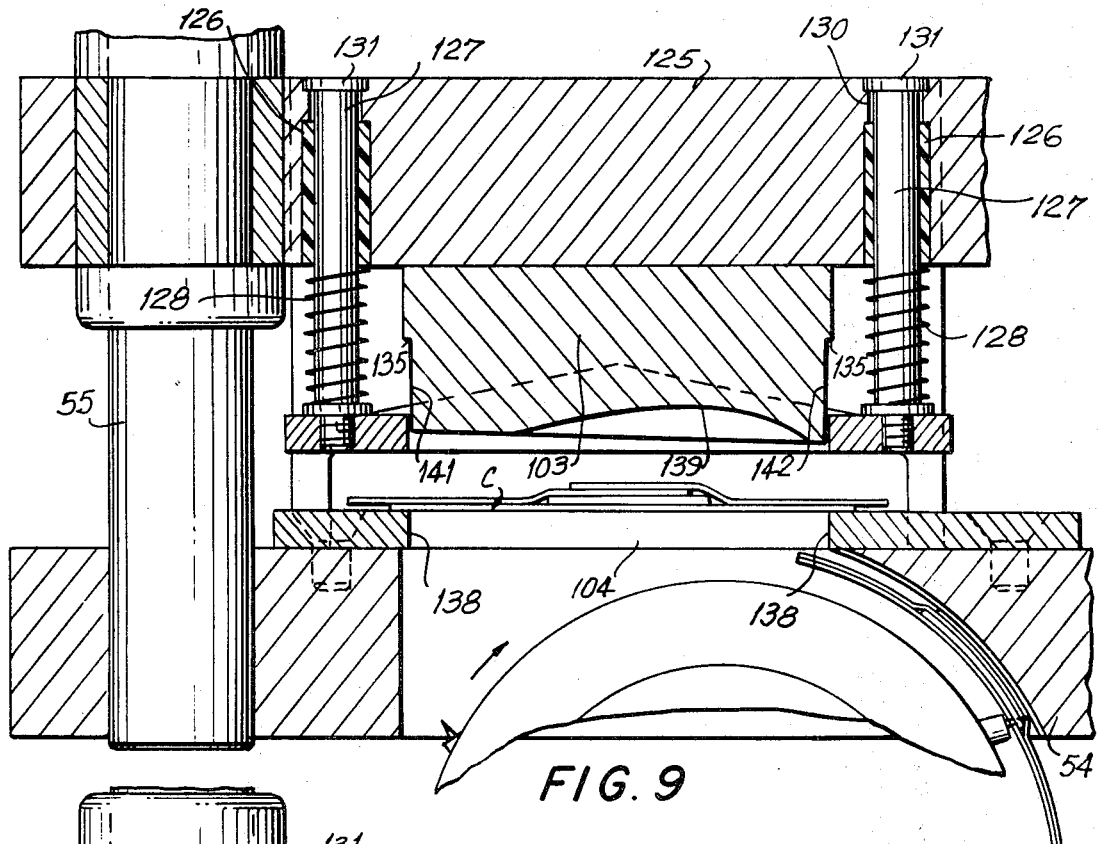
FIG. 9 is a transverse side sectional view upon the line 9—9 of FIG. 7.
Figure 10:
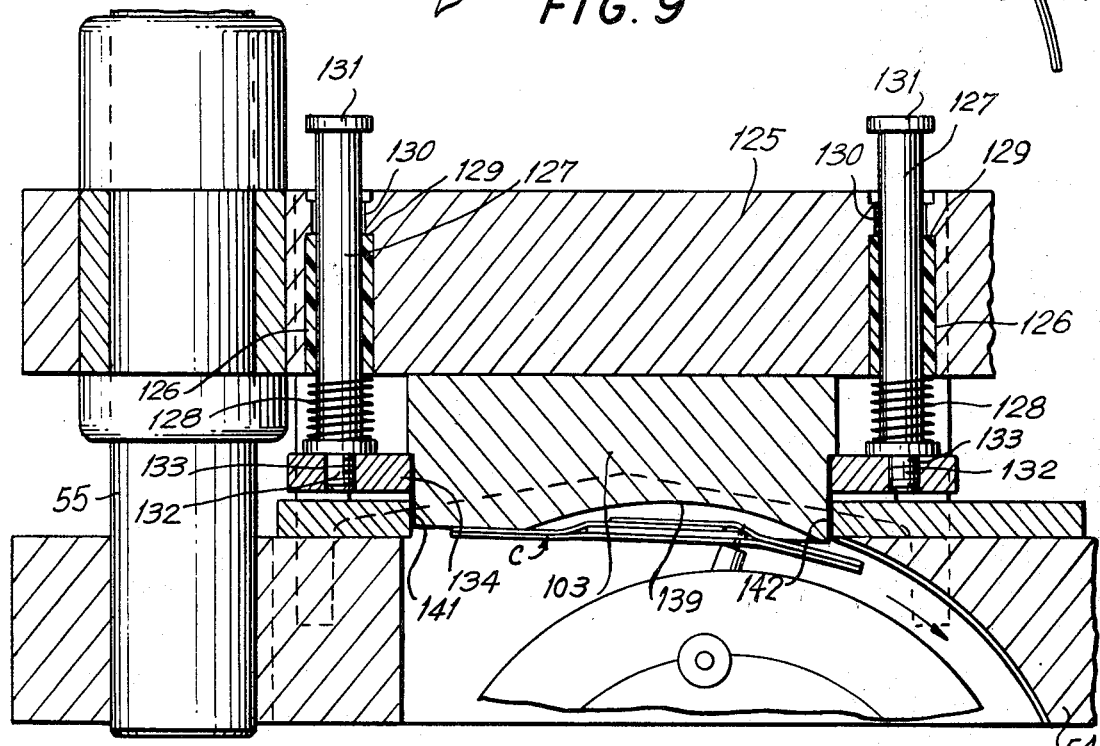
FIG. 10 is a transverse sectional view upon the line 10—10 of FIG. 8.

FIGS. 9 and 10 show the die element 103 upon an enlarged scale as compared to FIGS. 7 and 8 and the die element 103 is carried by the support structure 125, which has the opening 126 for receiving the guide pins 127 encircled by the coil springs 128. The coil springs 128 react against the shoulders 129.

These shoulders 129 are at the lower ends of the guide opening 130, through which the reciprocatory posts 127 having enlarged heads 131 are positioned. These posts have threaded lower end studs 132 which are threaded into the openings 133 in the plate member 134. The plate member 134 will act as a lower stop to contact the shoulders 135 of the reciprocating die element.

The edges of the die will closely fit inside of the side edge 138 of the die recess 104. The end face of the die is provided with a cut-out 139 which assures that there still be a release in the center of the bandage over the pad to prevent any distortion of the layers of the bandage.

The continuous strip C is shown in FIG. 9 before being die-cut, while the die-cut prepared cut rounded end bandage A is shown in FIG. 10.

The bandage is novel in that it is always die-cut on both rounded edges and one longitudinal edge and is not die-cut all round.

Desirably, the top half 125 of the die should be of solid aluminum, as should the connecting bracket 59 and the arm 66. The eccentric elements 75 and 76 should be of a strong alloy, such as steel. The male portion of the die, as indicated at 103, is slightly tapered at its side edges 141 and 142.

The present invention provides an improved method for making a prepared cut rounded end bandage, which does not result in a crushed edge, with the gauze pads in proper placement, and without distortion of the perforated thin plastic carrier strip. The backing is not stretched, due to the fact that the die-cutting is only on three edges, and the bandage will not be distorted so as to curl up upon itself.

The wrapper 301 is a strip of glassine or sulphite paper moving over guide rollers 302, 303 and 304, with rollers 303 serving to initiate the folding of the strip around the transfer wheel 310.

The tracking guide 300 shown in FIG. 7 serves to move assembled web of backing, gauze pads and cover strips from raising out of the horizontal cutting plates upon vertical reciprocating movement of the die.

The present procedure is particularly featured by its conservation of materials since there is a minimum loss of material in die cutting.

The leading distinctive feature resides in the cutting of only three sides with the assembly of backing and cover strips and intervening gauze pad being only advanced the width of the bandage. For example, this would be ¾" on a ¾" x 3" bandage.

This compares to a female die opening of ⅞" x 3". According to this procedure, only three edges of the die need be maintained in a sharpened state for continuous operation. The cut that is made is always a shearing cut due to slight obliquity of the edges of the male and female dies.

The transfer wheel 310 has a series of pins 311 carried by the ram rods 312 which are spring biased outwardly by the springs 313 held in the recesses 314 in the wheel 310.

On each ram rod 312 mounted laterally on the transverse shaft 315 is the cam follower 316 having ball bearings on the shaft 315. These followers 316 are actuated by the fixed interior cam 317 to permit proper timing of the piercing or impaling of the bandage on the point of the pin 311 and proper withdrawal of the pin 311 from the bandage A when deposited on the strip 301, which acts as an exterior wrapper.

Proper timing requires that impaling take place when the male punch is at bottom dead center of its cycle and at the leading edge of the gauze pad on the longitudinal center line of the bandage.

The slot 320 in the bottom face of the male punch is to provide clearance for the top of the pin after complete penetration through the bandage.

Having now particularly described and ascertained the nature of the invention, and in what manner the same is to be performed, what is claimed is:

1. The method of making a prepared cut bandage having parallel elongated straight sides and rounded end outside edges, with backing plastic sheeting, and overlapping removable cover strips and an intermediate gauze pad, providing the assembly of thin, flexible, stretchible plastic backing, removable centrally overlapping cover strips and intermediately disposed, centrally positioned gauze pads and die cutting prepared rounded cut bandages therefrom first on one side and then on the other side and rounded ends by providing a die cut opening wider than the bandage and projecting the assembly partly thereover after each die cutting operation and then only die cutting along one straight edge and along two rounded edges.

2. The method of claim 1, and die cutting so that the cut starts at one end of the bandage and ends at the other end.

3. The machine for making the bandage of claim 2, means for providing an assembly of thin flexible stretchible plastic backing removable centrally overlapping cover strips and intermediately disposed, centrally positioned gauze pads, a die cutter therefor for die cutting prepared rounded cut bandages therefrom first on one side and then on the other side and rounded ends having a die cut opening wider than the bandage and advancing means to project the assembly partly thereover after each die cutting operation, said die cutter including an upper reciprocating male element positioned to cut obliquely along one straight edge and along two rounded edges.

4. A machine for making the bandage of claim 2, having an assembly position, a die cutting position and a wrapping position, means to assemble the backing gauze pads and cover strips to form a continuous strip assembly means to advance the assembly to die cutting position, a die cutting arrangement consisting of a horizontal shelf with an opening having a transverse edge the length of the side edge of the bandage and side curved arcuate edges wider than the ends of the bandage and a reciprocating die head having a straight edge and arcuate edges matching said opening edges, and means to advance said assembly part way across said opening so that the cutting will be across the complete side edges of the advance portion and the rear transverse edge.

5. The machine of claim 4, said cut bandage after die cutting being transferred by a transfer wheel to a wrapping position.

6. The machine of claim 4, said assembly being advanced intermittently to the die cutting position.

References Cited

UNITED STATES PATENTS

| | | | |
|---|---|---|---|
| 2,891,306 | 6/1959 | Fontana | 29—419 X |
| 3,243,877 | 4/1966 | Scholl | 29—419 |
| 3,445,910 | 5/1969 | Duryee et al. | 29—419 X |

THOMAS H. EAGER, Primary Examiner

U.S. Cl. X.R.

29—200, 411, 417, 419; 128—156